Jan. 9, 1962  W. C. SILVER  3,016,024
SELF-PROPELLED REVERSING VEHICLE
Filed Feb. 24, 1956  5 Sheets-Sheet 2

INVENTOR:
WARNER C. SILVER.
BY
ATTORNEY

United States Patent Office 3,016,024
Patented Jan. 9, 1962

3,016,024
SELF-PROPELLED REVERSING VEHICLE
Warner C. Silver, 1324 Superior St., Toledo, Ohio
Filed Feb. 24, 1956, Ser. No. 567,552
15 Claims. (Cl. 104—149)

This invention relates to a self-propelled reversing vehicle. More particularly it deals with such a reversing vehicle which always faces its direction of travel and may be adapted for use with or without a track for guiding the vehicle. For example, an embodiment of this invention includes an electrically driven miniature automobile which may be controlled similar to an actual automobile and may be used as a toy, or with a toy electric train, or in the training of a person how to drive an automobile.

It is an object of this invention to produce a simple, efficient, effective, economically operated and amusing self-propelled reversing vehicle.

Another object is to produce such a self-propelled vehicle which may be instantaneously reversed and which always faces the direction of its travel.

Another object is to produce such a reversing vehicle in which the speed and/or space within which the vehicle is reversed may be adjusted.

Another object is to provide such a vehicle which may be guided along a track which not only guides the vehicle but also may supply electric current to it for driving the motor in the vehicle.

Another object is to provide such a vehicle which may be fastened to a continuous track.

Another object is to provide such a vehicle with a track in which the track comprises a plurality of light simply connected and relatively short sections which may be connected both end-to-end and in parallel to simulate two lanes of a highway with separate vehicles on each lane, if desired.

Another object is to produce such a vehicle with a separate control panel to simulate and operate controls the same as in an automobile.

Another object is to provide a system for such a self-operated vehicle including a garage, the door of which garage is operated automatically by the vehicle.

Another object is to provide such a vehicle having electrically operated means on the vehicle itself such as lights, a raisable ladder for fire engines, and the like.

Another object is to produce such a vehicle having interchangeable bodies which may simulate different styles of automobile such as sedans, coupes, sport cars, trucks, busses, ambulances, fire engines and the like and may be used in mobile advertising displays.

Generally speaking, the self-propelled reversing vehicle of this invention comprises a front truck for the front driving wheel or wheels of the vehicle and a chassis having a rear wheel or wheels. The front truck is pivoted on a vertical axis and under the front end of the chassis so that the chassis trails behind it, the truck being completely rotatable with respect to the chassis around its vertical connecting axis. In the case of a toy vehicle operated by an electric motor, such motor is preferably mounted in the truck to add weight and traction to the truck driving wheels and so that rotation of the chassis of the vehicle about the pivot between it and the truck will not materially effect the direction of movement or position of the truck.

In order to insure that the vehicle chassis after traveling several times its own length in any direction always faces its direction of travel, the axle on the chassis for the rear wheel or wheels of the vehicle is set slightly out of parallel alignment with the axle for the front or driving wheel or wheels on the truck, so that any reversing motion of the front driving wheel or wheels will cause the chassis immediately to Y backwardly around in the direction toward the rear axle end closer to the front axle and follow the truck at all times regardless of the direction of travel of the truck.

The electric motor in the truck for driving the vehicle may receive its source of power from batteries which may be mounted in the vehicle itself and connected through armature type connections about the pivot between the truck and the chassis, or if the vehicle is adapted to move along and/or attached to a track, the vehicle guides for the track may also comprise trolleys for conducting electric current directly to the truck itself upon which the trolleys are mounted. The batteries instead of being mounted in the chassis itself, may also be held in the hand of the operator of the vehicle together with the reversing control switch for the vehicle motor with the batteries and control switch being connected to the vehicle by means of a cable of a plurality of flexible conductors.

The track for the vehicle may comprise a groove, preferably having a C-shaped cross-section, in which groove the trolley is fitted so it cannot be vertically removed from the track and thereby maintain the vehicle on the track at all times. The track preferably is continuous and formed by grooves cut into adjoining sections of plywood boards, or formed of short light weight metal plate sections which are provided with central grooves and means for rapidly fitting, snapping or anchoring them together both laterally and in alignment with each other. Track sections also may comprise swtiches, cross-overs and curves as desired, or may be made of relatively flat flexible plastic material so as to be curved as desired. In order to insure alignment of the axle of the truck perpendicular to the groove in track at all times, a pair of spaced trolleys are preferably provided which are mounted on each side of the axle of the driving wheels on the truck. This spacing of this pair of trolleys also permits the jumping of the shorter spaces or gaps at cross-overs and switches to provide continuous current to the vehicle. The truck also may include means such as springs and/or weights for urging the trolleys into continuous engagement with the conducting rails along the groove in the track.

The system also may be provided with parking areas, spur tracks, and even a garage mounted over an end of a spur track, which garage may have a normally open overhead pivoted door which closes when the vehicle enters the garage. The garage also may be sufficiently large so that the car may turn around inside it and always head out of the door. The door opens as soon as the engagement of the front end of the car against the door operating mechanism has been released by reversing the direction or motion of the car.

The control for a vehicle with such a track may simulate that for the controls of an automobile and be connected through circuits so that turning of an ignition switch connects power to the vehicle, turning of a steering wheel operates switches to turn the vehicle on the track, operation of an accelerator type pedal will vary the speed of the vehicle through a rheostat, operation of a gear shift lever will cause the reverse of the vehicle, operation of a horn button blows a horn, etc. Also in a multiple track system, more than one vehicle may be employed with separate control panels which may be interconnected so that actual traffic conditions may be simulated for the training of persons how to drive automobiles.

The above mentioned and other features and objects of this invention and the manner of attaining them will become more apparent and the invention itself will be best understood by reference to the following description of embodiments of the invention taken in conjunction with the accompanying drawings, wherein.

The following detailed description of the above mentioned drawings will now be made in accordance with the following outline of the chapters and sections relating to the features of this invention:

OUTLINE

I. Vehicle chassis (FIGS. 1–5)
II. Trackless vehicle (FIG. 6)
III. Vehicle and track system (FIGS. 7–9)
   A. Garage (FIGS. 7 and 10)
   B. Trolleys on the vehicle
      1. Rolling (FIG. 3)
      2. Sliding (FIGS. 11–13)
      3. Sliding and/or rolling (FIGS. 14–17)
   C. Controls and circuitry (FIGS. 18–25)

I. VEHICLE CHASSIS

Figure 1:
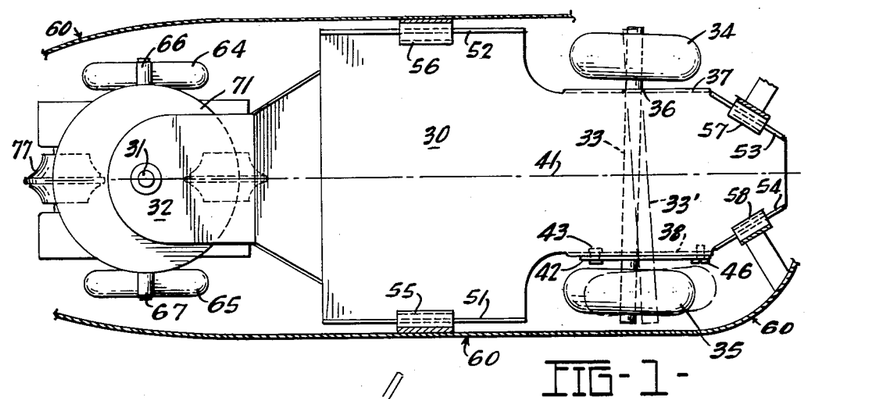
FIG. 1 is a top view of the chassis of the vehicle of this invention with parts of the body located thereon being broken away.
Figure 2:
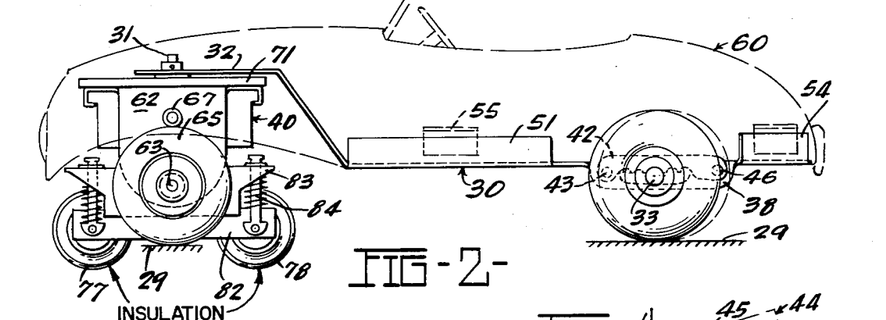
FIG. 2 is a side elevation of the chassis and truck of the vehicle shown in FIG. 1 with a sport coupe car body shown in dashed lines mounted thereon.
Figures 3, 4, 5:
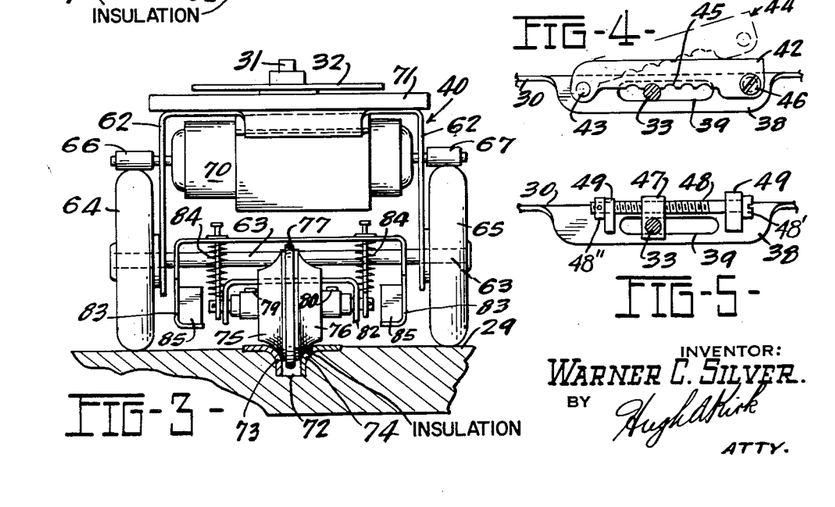
FIG. 3 is an enlarged front end view of the vertically pivoted driving truck for the vehicle shown in FIGS. 1 and 2, showing one form of a trolley track and the driving motor mounted thereon.
FIG. 4 is an enlarged side elevation of the adjustable mounting end of the rear axle on the chassis shown in FIGS. 1 and 2.
FIG. 5 is another embodiment of an adjustable mounting for one end of the rear axle as shown in FIG. 4.

Referring now to FIGS. 1 and 2, there is shown resting on a roadway 29 a self-propelled reversing toy vehicle according to one embodiment of the present invention which comprises a chassis 30 having a vertical pivot 31 at its forward end 32 which may be offset from the base of the chassis 30 to provide sufficient room for a truck and driving assembly 40 to be pivotably mounted on said pivot 31 between it and the roadway 29 upon which the vehicle may roll on its wheels. The rear of the chassis 30 is provided with a rear axle 33 on the ends of which are freely mounted a pair of rear wheels 34 and 35 which may be rubber tired to simulate that of an actual automobile. One end of the axle 33 adjacent to wheel 34 may be journaled in a circular hole 36 in a flange 37 provided along one side of the rear of the chassis 30, while on the other side of the rear of the chassis 30 a flange 38 is provided with a longitudinal slot 39 therein as shown in FIGS. 4 and 5. This slot 39 may extend to both sides of the line through the hole 36 and perpendicular to the longitudinal center line 41 of the vehicle (see FIG. 1). Pivotally mounted above the slot 39 may be a notched lever arm 42 pivoted at 43 beyond one end of the slot 39 so that it may be moved into the dotted position 44 as shown in FIG. 4 for the free movement of that end of the axle 33 adjacent to wheel 35 along the slot 39. However, when the notched arm 42 is in the full line position shown in FIGS 2 and 4, one of the notches 45 engages the axle 33 as a bearing to hold it in a position away from the perpendicular to the center line 41 and out of normal parallelism with the front axle 63 of the vehicle. The pivoted arm 42 may be locked in its full line position by a clamping screw 46 located at the other end of the slot 39 from the pivot 43, so that once the axle is set in out of alignment position it will maintain this position.

Figures 7, 22:
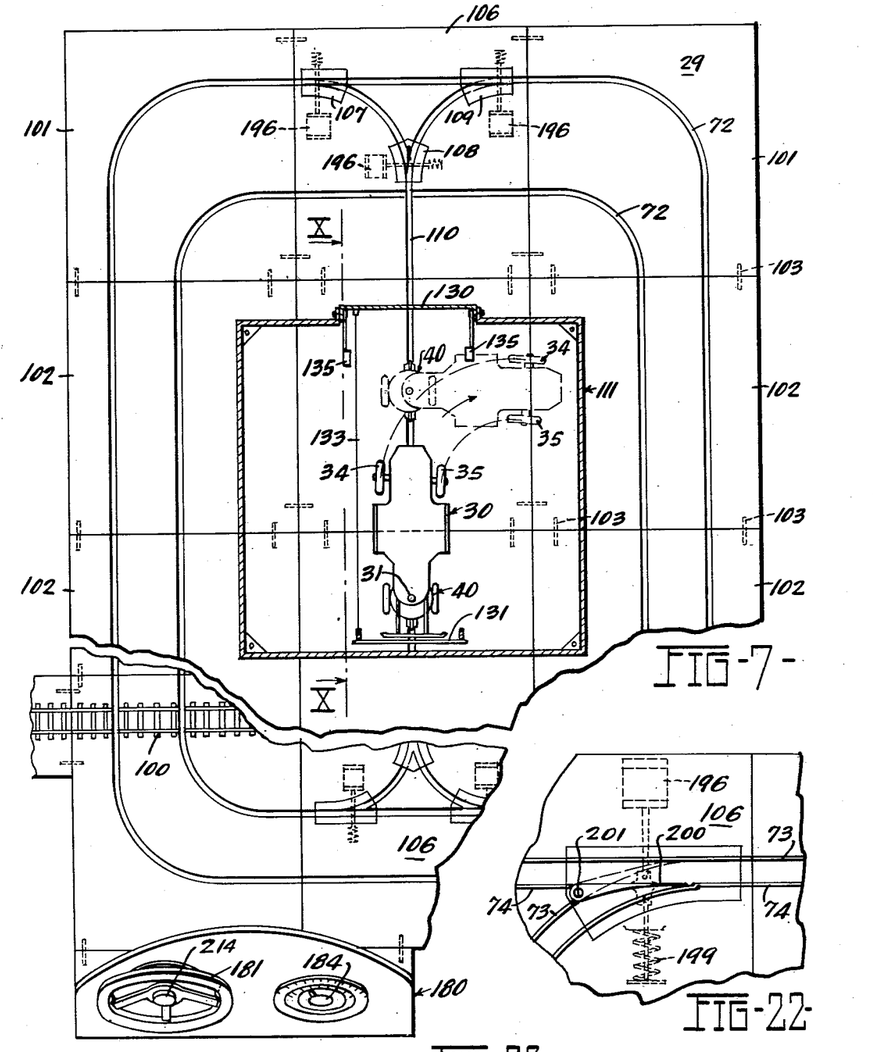
FIG. 7 is a layout of a two track system for a vehicle provided with switches, cross-overs, curves, automobile type control panel, and combination therewith the track of an electric train, garage, and in dotted lines the Y reversing path of the vehicle shown in the garage.
FIG. 22 is an enlarged plan view of a solenoid operated track switch as shown in the system of FIG. 8.

Thus, when the vehicle is reversed in its direction of travel, the rear end of the chassis will be immediately turned out of line with the front drive wheels of the vehicle so it will Y around as shown in dotted lines in FIG. 7 and always follow the track 40. The more the axle 33 is out of perpendicular alignment to the center line 41, the sharper and shorter will be the Y turning when the vehicle is reversed. By placing the angle of the rear axle 33 in its dashed line position 33' shown in FIG. 1 on the other side of the perpendicular with line 41, the vehicle will Y in the opposite direction from that in which it will Y with the axle 33 in its shown full-line position.

Instead of the notched arm 42 shown in FIG. 4 for adjusting the out of alignment of the rear axle 33 of the vehicle a finer adjustment may be obtained by mounting the axle 33 in a worm bearing 47 as shown in FIG. 5 which may be threaded along a bolt 48 mounted at its ends in brackets 49 attached to the flange 38 at either end of the slot. The spaced brackets 49 contain bearing surfaces for the free rotation of the bolt 48, which bolt may be restricted from longitudinal movement by its head 48' on the outside of one bracket and a lock collar 48" on the outside of the other bracket, so that as the bolt 48 is turned (such as by a screwdriver) one end of the axle 33 is moved along the slot 39.

The chassis 30 may also be provided with upstanding flanges 51, 52, 53 and 54 which may cooperate with spring clips 55, 56, 57 and 58, respectively, mounted on the inside of a body 60 which may be replaced by other body styles than the sport coupe or speedster style body shown in FIG. 2; the other body styles being provided with clips 55 through 57 similarly located so they may be readily interchanged by snapping them on and off of the chassis 30.

The offset or raised front end 32 of the chassis 30 is mounted on the pivot 31 of the truck 40, which truck 40 may comprise a U-shaped frame 62 (see FIG. 3) across the open end of which may be mounted the front axle 63 at opposite ends of which may be freely mounted rubber tired front driving wheels 64 and 65. In the embodiment shown in FIGS. 1 to 3 the driving wheels 64 and 65 are frictionally driven by rubber rollers 66 and 67, respectively, mounted on opposite ends of the shaft of an electric motor 70 mounted between the sides of the frame 62 above the axle 63.

In this particular embodiment the top of the frame 62 may be provided with a disk weight 71 to insure good frictional contact between the wheels 64 and 65 and the road 29.

The embodiment shown in FIGS. 1 to 3 is adapted for a vehicle operated along a guiding and electrically conducting track which may comprise a groove 72 (see FIG. 3) in the roadway 29, which groove may have opposite sides thereof provided with spaced opposite polarity conducting rails 73 and 74 which cooperate with separate bevelled electrically conducting sides 75 and 76 of a pair of insulated guide rollers 77 and 78. It is to these bevelled sides of the guide rollers that the two pairs of conductors to the motor 70 are connected in parallel through brushes, such as 79 and 80, which may rest on hubs, sleeves, or sides of the bevelled sides 75 and 76, respectively, on each guide roller 77 and 78. These guide rollers 77 and 78 are preferably mounted on a separate frame 82, which in turn may be mounted on an additional separate frame 83 through means of springs 84. Frame 83 is then mounted on the axle 63 and dragged along by it, preferably through slots for the axle 63 along opposite sides of the frame 83. Also, if desired, the frame 83 may be provided with weights 85 to further insure good contact of the trolleys 77 and 78 with the conducting track rails 73 and 74.

II. TRACKLESS VEHICLE

Figures 6, 11:
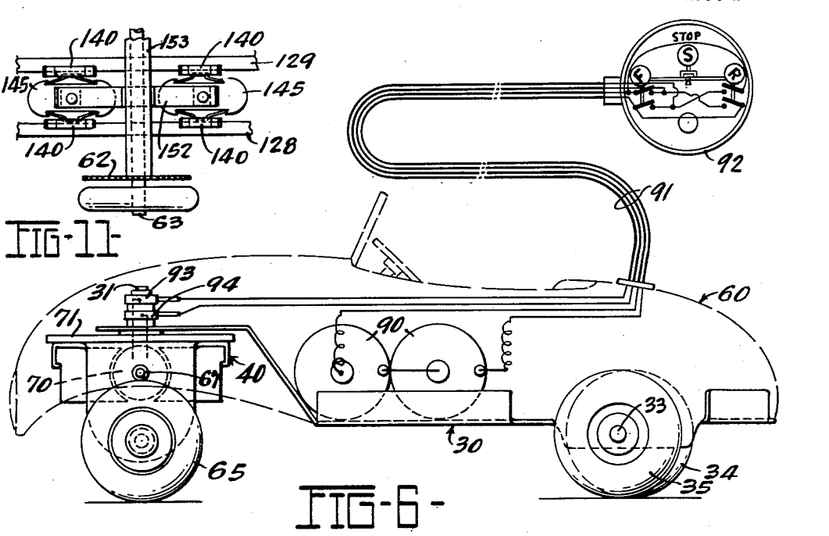
FIG. 6 is a side elevation of a trackless self-propelled reversing vehicle according to this invention in which the batteries for driving the vehicle are located in the chassis and the vehicle is controlled through a flexible cable connected to a reversing switch remote from the vehicle.
FIG. 11 is a plan view with parts broken away of a pair of sliding type trolleys which may be adapted for use with the grooved track shown in FIG. 9.

Referring now specifically to FIG. 6, there is shown another and trackless embodiment of the self-propelled reversing vehicle of this invention which may comprise a similar chassis member 30 as that shown in FIGS. 1 and 2 upon which may be mounted a similar detachable body 60, however, in the chassis 30 there may be mounted an electrical energy source such as batteries 90 which may be electrically connected through a flexible cable or cord 91 to a manual switch 92 which may be carried by the operator of the vehicle as he walks along with it. This switch 92 may have stop S, forward F and reverse R buttons thereon so as to reverse the direct current from the battery 90 through the motor 70. This truck 40, however, is not provided with the additional frames 82 and 83 for the trolleys 77 and 78 or a fixed track in that it is driven from electric current through commutators 93 and 94 around the pivot 31 in the vehicle, for connecting the batteries 90 to the motor 70 through the manual switch 92. Thus, by changing the direction or polarity of the direct current from batteries 90 to the motor 70 to reverse its direction of rotation, the front driving wheels 64 and 65 are reversed, so that the offset rear axle 33 of the vehicle will cause it to Y around and follow the truck 40 regardless of the direction of rotation of its wheels 65. If desired, the batteries 90 may be carried by the operator with the switch 92, so that then only two conductors need to be provided in the cable 91 for controlling the reversing of the motor 70. This has the advantages of reducing the weight of the chassis 30 of the vehicle so that the relative weight of the truck 40 is sufficient to not be thrown out of line by the momentum of the Y turning of the vehicle, as well as reducing the wires in the cable 91 to the vehicle 60.

III. VEHICLE AND TRACKS

Figure 8:
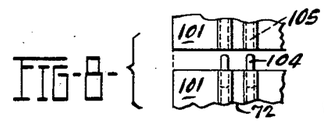
FIG. 8 is a detail of the way the rails of the track system shown in FIG. 7 may be connected by pins and sockets.

Referring now to the roadway or track system which may be provided for the vehicle of this invention according to FIGS. 1 to 3, reference is first had to FIGS. 7 and 8 in which there is shown the roadway 29 comprising adjoining square sheets of plywood with pairs of groove tracks 72 cut therein which grooves are formed to make two continuous circuits. This roadway 29 also may be used in cooperation with toy electric train railroads as shown by railroad track 100 crossing the roadway 29 in the lower left corner of FIG. 7. The different square sections 101 for the curve and 102 for the parallel straight portions of the roadway track may be fastened together at their edges by bridging U-clamps 103 from the bottom of the sections 100 and 102, and the ends of the conductor rails may be fitted together by pins 104 which cooperate with sockets 105 of the rails, or the open ends of tubular rails as shown in FIG. 8 between two adjacent sections 101. There also is shown square sections 106 containing a cross-over and switches 107, 108, and 109 connecting a Y-spur track 110 which enters a garage type structure 111.

Figures 9, 12, 13, 14, 17:
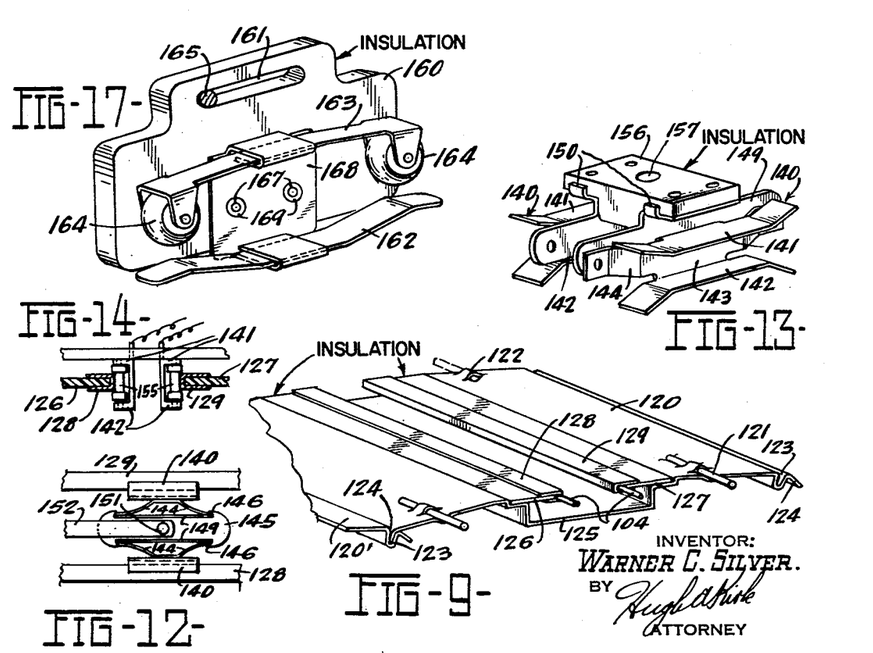
FIG. 9 is a perspective view of a metal track section having a C-shaped guide and conducting groove or channel for a trolley, and means for connecting other similar sections of tracks both laterally and end-to-end thereto.
FIG. 12 is an enlarged plan view of one of the trolleys shown in FIG. 11.
FIG. 13 is a perspective view of a modified form of one of the pairs of slide shoes or trolleys shown in FIGS. 11 or 12.
FIG. 14 is an end view of a trolley in a cross-sectioned track groove, similar to that shown in FIGS. 11, 12 or 13, including grooved rollers for engagement with the rail edges of the track.
FIG. 17 is a perspective view of one of the trolleys shown in FIGS. 15 or 16.

Instead of the large wood or plywood sections 100, 102 and 106 shown in the system of FIG. 7, a track for a vehicle of this invention may be made out of light pressed metal sections 120 such as shown in FIG. 9 which may be rolled or pressed out of sheet material, cut to convenient lengths and provided with interfitting pins 121 and sockets 122 at opposite ends thereof as well as correspondingly side edge grooves 123 into which the edge flanges 124 of an adjacent section may be fit to make adjacent parallel or two lane roadways as shown at the lower left of FIG. 9 for the corner of adjacent section 120'. These particular sections 120 are provided with a central rail and guideway of C-shaped cross-section which may be formed by a central offset channel 125, as a continuous portion of the roadway member 120, with parallel insulation strips 126 and 127 anchored along the upper edges of said channel having clamped over the adjacent overhanging edges electrically conducting rail strips 128 and 129, respectively, for cooperation with the trolleys of the vehicle (see also FIG. 15). These light sections of track 120 may be provided in straight or curved sections and may also be provided with switches and cross-overs similar to those track sections provided for electric trains. The ends of the rails 128 and 129 may be fitted together by pins 104 and sockets 105 as shown in FIG. 8.

III—A. Garage

Figure 10:
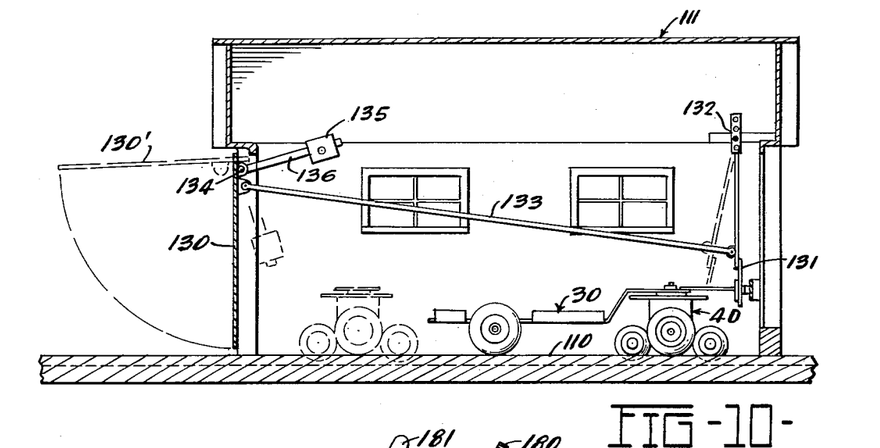
FIG. 10 is a side elevation of the garage shown in FIG. 7 and the car in the garage to show how it automatically operates a counter-balanced door to the garage.

Referring now more specifically to FIGS. 7 and 10, there is shown a garage 111 which may be provided in cooperation with a track guided vehicle in which a spur track 110 extends into the garage. The garage 111 may be provided with a counterbalanced entrance door 130 which is normally in its open dotted line position 130' as shown in FIG. 10. However, when the vehicle enters the garage and abuts against the end of the lever 131 which is pivoted at 132 near the top of the garage, it pulls on the wire 133 connected to the door 130 below its pivot 134 to counteract the counter weight 135 connected to the door to cause the door to close into full line position shown in FIG. 10. Because of the internal friction of the driving gear of the car, the counter weight 135 is not sufficient to push the car out of position until the motor in the truck 40 of the car is reversed. As soon as this occurs and the car is released from pushing against the end of the lever 131, the weight 135 swings the door 130 again into its open and dotted line position. If desired the interior of the garage may be made sufficiently large so the car may turn around inside the garage as shown by the dotted lines in the center of FIG. 7, and always come out of the garage head first the same as it enters. There may be provided adjusting pivot points for the pivot 132 on the lever 131 as well as adjustment for the counterweight 135 along its lever arm 136.

III—B. Trolley on the vehicle

1. ROLLING

Referring again to FIG. 3, an entirely rolling type of trolley has been shown comprising a pair of insulated plastic disk wheels 77 and 78, with opposite conducting bevelled sides 75 and 76 which make contact between two rails 73 and 74 of substantially L-shaped cross-section located over the upper corners of the groove 72 in track roadway 29. However, these rails 73 and 74 may be replaced by metal tubing, such as small aluminum tubes shown in FIG. 8 without requiring a different type of trolley from that shown in FIG. 3.

Other types of tracks and trolleys also may be provided without departing from the scope of this invention, in which the vehicle or trolley is anchored to the track so that the vehicle, regardless of its speed of operation or change in direction or acceleration, will not jump the track. Some of these types of trolleys for different types of tracks are described below.

III—B—2. SLIDING TROLLEYS

Referring now specifically to FIGS. 11 through 13, there are shown entirely sliding types of trolleys which are adapted to engage both sides of the rails 128 and 129 shown in the type of track of C-shaped cross-section of FIG. 9. These sliding type of trolleys may be formed of a pair of spring metal members 140 (see FIGS. 11, 12 and 13) with resilient top and bottom sides 141 and 142 to form a U-shaped channel in which one of the overhanging conducting rails 128 or 129 slides. The back or bottom side 143 of this U-shaped channel has its ends 144 bent away from the rail (see FIG. 12) to snap in between notches 146 near the ends of an insulated plastic shoe member 145. Also between the notches 146 on the same side of the shoe member 145 may be provided metal plates 149 with upstanding ears 150 to which the electrical contacts to the motor 70 may be soldered without taking the temper out of the spring members 140. This whole assembly on the shoe member 145 may be connected with a vertical pivot pin 151 to one end of a resilient arm 152 which may be connected to the frame 62 via member 153 (see FIG. 11) or to frame 83 (see FIG. 3) or directly to the axle 63, or to the bottom of a vertical plate member 160 similar to that shown in FIG. 17, which plate 160 is provided with a slot 161 into which the driving axle 63 of the vehicle may slide, so that the pair of trolleys is dragged rather than pushed by the motion of the vehicle to prevent its jamming at any of the junctions between tracks sections, switches or cross-overs which may not be too smooth.

Instead of the shoe members 145, the members 140 may be connected to an insulated plastic block 156 (see FIG. 13) which may be connected to the resilient arm 152 and pivot 151 through the hole 157 in the block 156.

III—B—3. SLIDING AND/OR ROLLING TROLLEYS

If desired, between the side edges of flanges 141 and 142 of the resilient members 140 of the sliding trolleys of FIGS. 11–13, there may be provided one or more grooved rollers 155, as shown in FIG. 14, to reduce the friction between the members 140 and the rails 128 and 129.

Figures 15, 16, 24, 25:
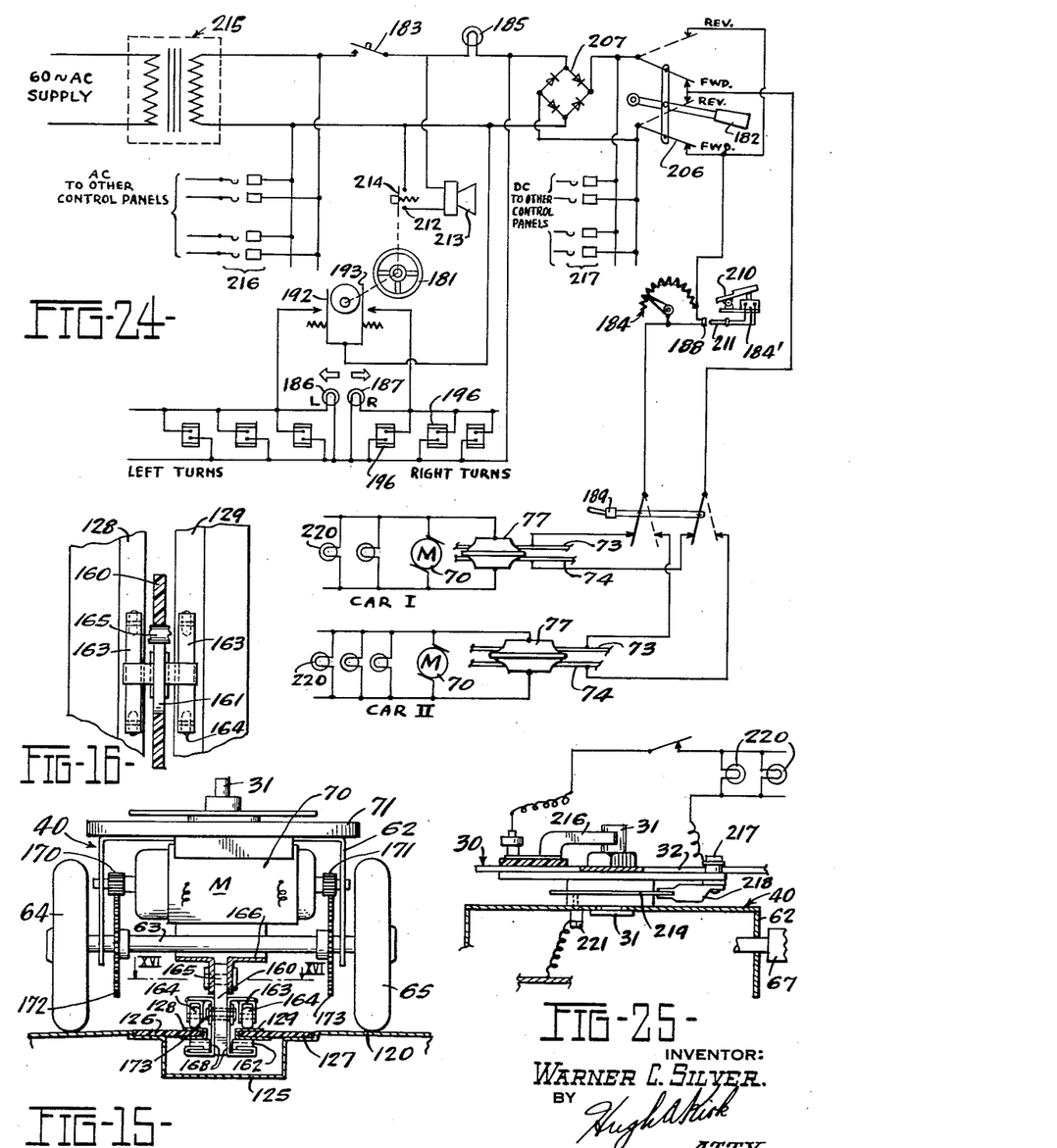
FIG. 15 is an end view of a gear driven truck similar to that shown in FIG. 3 and employing another type of slide and roller trolley for the track.
FIG. 16 is a plan view of one of the trolleys taken along line XVI—XVI in FIG. 15.
FIG. 24 is a wiring diagram of a control system for operating two cars on separate tracks in a system according to that shown in FIG. 7.
FIG. 25 is a vertical section of a modified form of electrical connection through a vertical pivot mounting between a truck and chassis similar to that shown in FIG. 6, and which may be used for operating lights in a track connected vehicle.

Still another type of trolley and drive for a self-propelled reversing vehicle with a rail and track section similar to that shown in FIG. 9, is shown in FIGS. 15, 16 and 17 in which the pair of trolleys are mounted on a vertical insulated plastic plate 160 on each side of which is mounted a lower free ended resilient flange 162 whose ends may press upwardly against the bottom of the overhanging rails 128 and 129. Above each of said flanges 162 is another and complementary resilient member 163 provided at its ends with friction reducing rollers 164 which ride on the top of the rails 128 and 129 opposite the ends of flange 162. In this embodiment the plate member 160 with its slot 161 is mounted on a pin 165 which is connected to the frame 62 of the truck 40 by means of a bracket 166 (see FIG. 15). The metal terminals and rivet connections 167 through plastic plate 160 for the trolley members 162 to 164 on opposite sides thereof are preferably also insulated from their back plates 168 by insulating sleeves 169 (see FIG. 17).

Also, the motor 70 mounted in the frame 62 may be provided with pinion gears 170 and 171 which drive spur gears 172 and 173, respectively, mounted with the driving wheels 64 and 65 on the axle 63. Thus, instead of a friction drive a more positive drive of the wheels 64 and 65 may be had through the gear arrangements 170 through 173 as shown in FIG. 15, which drive also may be employed with the type of trolleys shown in FIG. 3.

III—C. Controls and circuitry

Figures 18, 20:
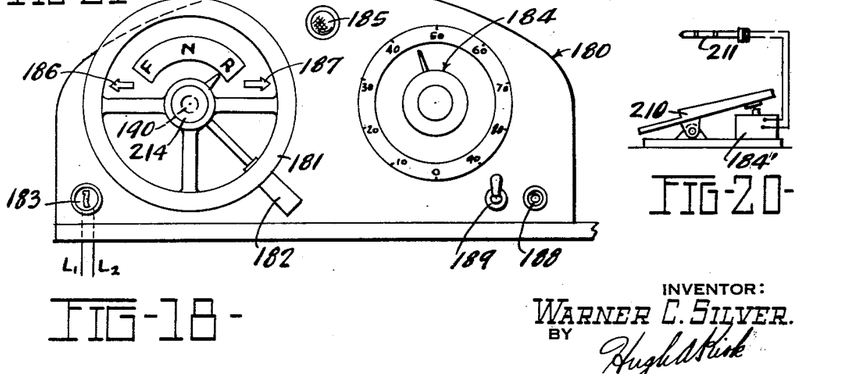
FIG. 18 is an enlarged front view of a control panel for operating a vehicle with a track similar to that shown in FIG. 7.
FIG. 20 is a modified form of accelerator pedal which may be employed instead of or in combination with the rheostat type speedometer dial shown on the control panel in FIGS. 18 and 19.
Figure 19:
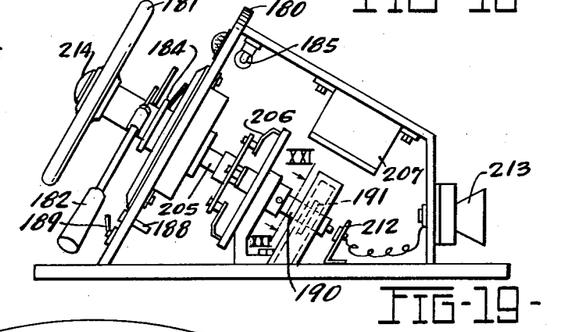
FIG. 19 is a right side or end view of the control panel shown in FIG. 18.
Figure 21:
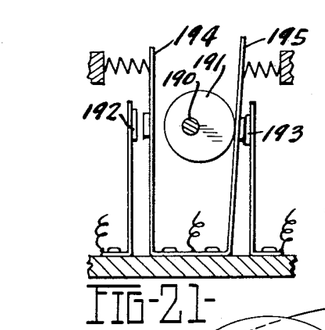
FIG. 21 is an enlarged sectional view taken along line XXI—XXI of FIG. 19 showing a left and right track-switch operating electrical switch operated by a cam connected to the end of the steering wheel.

Referring now to FIGS. 7, 18 and 19, there is shown a control panel 180 outside the vehicle, such as at the edges of one of the track panels 101, 102, 106, which control panel simulates the dashboard and controls of an actual automobile including a steering wheel 181, a gear shift or reversing lever 182, a key starting switch 183, a speedometer indicating type speed rheostat 184, a panel light 185, direction lights 186 and 187, and, if desired, also a jack plug socket 188 and a parking switch 189 by which another control panel similar to 180 may be switched in for simultaneously or alternately controlling another automobile operating on another or parallel track as shown in FIG. 7.

Figure 23:
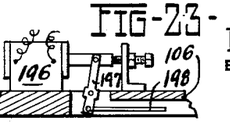
FIG. 23 is a side elevation of a solenoid operator which may be used for operating a switch as shown in FIG. 22.

Considering separately these electrical controls for governing the operation of an automobile on a track similar to that shown in FIG. 7, the steering wheel 181 through its steering column 190 may have mounted thereon an eccentric cam 191 (see FIG. 21) which in different positions, 180° apart, closes either contact 192 and 193 by moving normally open resilient contact springs 194 and 195 to operate track switches 107, 109, and 108 shown in FIG. 7, as well as the corresponding direction signal 186 or 187 on the panel 180, so that as the vehicle approaches one of these track switches, turning of the steering wheel 181 will operate it and correspondingly turn the vehicle. These track switches may be operated by solenoids 196 as shown in FIGS. 22 and 23, which through a pivoted lever 197 and link 198 against the action of a spring 199 moves the track switch blade 200 from one side of the rail conductor to the other (see its full line to the dotted line position in FIG. 22). As shown in FIGS. 22 and 23, the solenoid 196 may either be mounted below or above its roadway or track section 106. The pivot 201 for the blade 200 of the track switch is preferably insulated and spaced from the adjacent rails 73 and 74, so as not to cause any electrical short circuit, and the contact of the free end of metal blade 200 with its corresponding side rail 73 or 74 will necessarily continue its electrical polarity and conductivity up to the small space between the pivot 201 and the adjacent rail end, which small space can easily be bridged by the larger space between the pairs of trolleys attached to the vehicle, so that a continuous supply of energy is applied to its motor 70, even when passing a track switch.

Referring now to the reversing gear lever 182 shown on the panel 180, it may be used to operate through a sleeve 205 around the steering column 190 (see FIG. 19), a reversing switch 206 which reverses the polarity of the D.C. current which causes a reversal of the rotation of the motor 70 driving the vehicle. This D.C. current may be generated from an A.C. current by passing it through a rectifier, such as selenium oxide rectifier 207, which may be mounted behind the panel 180 as shown in FIG 19.

The speed control rheostat 184 on the speedometer type dial on panel 180, instead of being controlled by a manual knob as shown, may be controlled by a foot or pedal switch 210 as shown in FIG. 20, which may be connected by means of a cable and jack 211 into a socket 188' (see FIG. 24), similar to socket 188 shown in FIG. 18 in the panel 180, with a rheostate 184' being mounted with and below the pedal 210. When jack 211 is inserted into plug 188' as shown in FIG. 24 so that the rheostats 184 and 184' are in parallel, it is necessary for the operation of either one of said rheostats that the other one is in its maximum resistance position or else in an "off" position completely disconnecting it from the circuit.

At the center of the steering wheel 181 may be provided a horn button 214 which may be connected to a switch 212 for operating a horn 213 which may be mounted on the back of the panel assembly 180. When one of the cars or vehicles is in the garage 111 as shown in the system of FIG. 7, and another car is then to be operated, a parking switch 189 may be provided to cut off the current to the garaged car and connect the same or another control panel for operating another car, by switching the current over to the other parallel or separate track circuit having that other car on it.

The above described controls may be electrically connected together in accordance with the wiring diagram shown in FIG. 24, in which a 60 cycle A.C. supply may be connected through a transformer 215 (similar to that employed in operating toy electric trains) and thence to the switches and connections shown numbered correspondingly to those just described in connection with FIGS. 18 through 23. In order to reduce the power required of the rectifier 207, the solenoids 196 for operating the track switches may be A.C. solenoids and be connected directly to the A.C. current from the transformer 215. The starting switch 183 may also be in the transformed A.C. circuit as well as the horn 213 and its control switch 212.

If two parallel circuits are used, double pairs of jack contacts 216 and 217 are required for both the A.C. and D.C. supplies which contacts may be provided on one jack plug which may fit into the jack socket 188 on the panel 180. The change-over or parking switch 189 may only be required in the D.C. circuit to switch over from one set of conducting rails 73 and 74 to the other set on which the other car rests.

The vehicles of this invention may have headlights and taillights, which may be connected through the same circuits to the vehicles as their motors 70, however since these lights 220 are usually on the chassis 30 and not the truck 40 with the motor 70, their electrical connections must pass the pivot 31 in similar manner to that shown in FIG. 6 or 25. In FIG. 25 the chassis 30 is considered as one conductor while the other is insulated therefrom through a wiping brush 216 contacting the projecting upper conducting end of the vertical pivot 31 which pivot is electrically connected to one of the trolley and track conductors. The other conductor of the circuit for lights 220 may be connected through a terminal 217 on the chassis frame end 32 to a wiper 218 cooperating with a disk 219 spaced between the chassis frame 30 and truck frame 40 and insulated from the pivot 31. This disk 219 is then connected to the other conductor of the trolley and track from a terminal 221 connected to frame 62 but insulated from it and pivot 31.

Although several different modifications of the present invention have been shown in connection with different types of tracks and different types of trolleys for cars which may be self-propelled by an electric motor, either trackless or with a track, any combination or interchange of the elements disclosed herein can be made without departing from the scope of this invention.

While there is described above the principles of this invention in connection with specific apparatus, it is to be clearly understood that this description is made only by way of example and not as a limitation to the scope of this invention.

What is claimed is:

1. A self-propelled vehicle comprising: a chassis having a front portion and a longitudinal axis, at least one front wheel, a truck mounting said front wheel, means for attaching said truck to said front portion whereby said truck is free for complete rotation relative to said chassis about a vehical axis, self-propelling power means mounted in said vehicle and adapted to drive said front wheel, a pair of rear wheels, an axle connected to said rear wheels, and means for attaching said axle to said chassis rearward of said front wheel, said attaching means permitting limited angular movement of said axle slightly out of perpendicular with said longitudinal axis of said chassis.

2. A vehicle according to claim 1 wherein said means for attaching said axle to said chassis comprises a pair of spaced bearing means, with one of said bearing means comprising a substantially horizontal slot.

3. A vehicle according to claim 1 including means for variably adjusting the angle between said axle and said longitudinal axis.

4. A vehicle according to claim 3 wherein said adjusting means comprises a plural seated bearing for one end of said axle.

5. A vehicle according to claim 3 wherein said adjusting means comprises a movable bearing for one end of said axle, and screw means for moving said bearing.

6. A vehicle according to claim 1 wherein said means for driving said front wheel comprises a reversible electric motor mounted in said truck.

7. A vehicle according to claim 6 including means for conducting two-way electric current across said attachment means between said truck and said chassis.

8. A vehicle according to claim 6 containing a direct current power source and a manually operated switch remote from said vehicle for reversing the polarity of current from said power source to said motor to reverse the rotation of said motor and direction of said vehicle.

9. A vehicle according to claim 6 including a track for said vehicle, and a trolley means mounted on said truck for both guiding said truck along said track and transmitting electric current to said electric motor.

10. A vehicle according to claim 9 wherein said trolley means is connected to said truck through a pin in a horizontal slot to permit limited relative longitudinal motion of said trolley with respect to said truck opposite to the direction of movement of said truck whereby said trolley is dragged rather than pushed by said vehicle regardless of the direction of movement of said truck.

11. A vehicle and track according to claim 9 wherein said track includes a plurality of track switches.

12. A vehicle according to claim 11 including a control panel electrically connected to said track simulating the control of an automobile having: a reversing gear shift type lever switch for reversing the current to said reversible electric motor mounted in said truck, a starting type switch, an accelerator type speed control rheostat switch for varying the speed of said electric motor mounted in said truck, and a steering wheel switch arranged for operating said track switches.

13. A self-propelled vehicle comprising: a chassis having a longitudinal axis and front and rear portions, a truck mounted under the front portion of said chassis, means for mounting said truck under said chassis for unobstructed rotation about a vertical axis with respect to said chassis, front and rear wheels for said vehicle, means for mounting said front wheels on said truck, motor means for rotating said front wheels to move said vehicle, means for mounting said rear wheels on a single axle mounted on said rear portion of said chassis, said mounting means for said rear wheels including means for permitting movement of said axle slightly out of perpendicular to said longitudinal axis of said vehicle, and means for reversing the rotation of said front wheels whereby the angularity of said axle for said rear wheels causes said chassis to rotate about said vertical axis which causes said vehicle to Y-around so as to always follow said truck regardless of the direction of rotation of said front wheels.

14. An electric motor driven self-propelled vehicle and a track for said vehicle comprising a parallel pair of electrically conductive spaced rails for supplying energy to the motor of said vehicle and for guiding the vehicle along said track, said vehicle comprising: at least three wheels mounted for rotation in at least two parallel planes, a truck having at least one of said wheels, a chassis having a longitudinal axis and at least one other of said wheels mounted on an axle transverse of said axis, means for mounting said chassis for unobstructed complete rotation about a vertical axis with respect to said truck, an electric motor mounted on said vehicle adapted to drive said truck wheel, means for reversing the rotation of said truck wheel, means for attaching said axle to permit limited angular movement of said axle slightly out of perpendicular with said longitudinal axis of said chassis whereby reversing of the rotation of said wheel on said truck causes said chassis to rotate about said vertical axis which causes said vehicle to Y-around said truck so as to always follow said truck regardless of the direction of rotation of said wheel on said truck, a dual electrically conductive trolley mounted beneath said truck and engaging said pair of rails, said trolley being connected to said electric motor, and an electric power source connected to said rails for conducting power from said rails through said trolley to said electric motor in said vehicle.

15. An electric motor driven self-propelled vehicle and a track for said vehicle comprising a parallel pair of electrically conductive spaced rails for supplying energy to the motor of said vehicle and for guiding said vehicle along said track, said vehicle comprising: a truck having two axially aligned spaced driving wheels, a chassis having a longitudinal axis and two axially aligned spaced following wheels mounted on an axle, means for mounting said chassis for unobstructed complete rotation about a vertical axis with respect to said truck, means for reversing the rotation of said driving wheels, means for attaching said axle to permit limited angular movement of said axle slightly out of perpendicular with said longitudinal axis of said chassis whereby reversing of the rotation of said driving wheels on said truck causes said chassis to rotate about said vertical axis which causes said vehicle to Y-around said truck so as to always follow said truck regardless of the direction of rotation of said wheels on said truck, an electric motor mounted on said truck adapted to drive said driving wheels, a pair of dual electrically conductive trolleys mounted between said two truck driving wheels and engaging said pair of rails, a frame for mounting said trolleys to said truck, resilient means to continuously urge said trolleys between and into electrical contact with both of said rails, and guide means on said trolleys to hold said vehicle on said track.

References Cited in the file of this patent

UNITED STATES PATENTS

| | | |
|---|---|---|
| 474,355 | Baker | May 10, 1892 |
| 537,194 | Guest | Apr. 9, 1895 |
| 1,041,677 | Sadtler | Oct. 15, 1912 |
| 1,048,770 | Walker | Dec. 31, 1912 |
| 1,507,723 | Avery | Sept. 9, 1924 |
| 1,609,211 | Sladek | Nov. 30, 1926 |
| 1,731,557 | Wright | Oct. 15, 1929 |
| 1,930,450 | Langos | Oct. 10, 1933 |
| 2,036,802 | Fleishman et al. | Apr. 7, 1936 |
| 2,050,892 | Marx | Aug. 11, 1936 |
| 2,068,403 | Ekstrom | Jan. 19, 1937 |
| 2,072,374 | Manoil | Mar. 2, 1937 |
| 2,112,072 | Cullen | Mar. 22, 1938 |
| 2,115,108 | Horn | Apr. 26, 1938 |
| 2,166,752 | Cullen | July 18, 1939 |
| 2,257,473 | McKeige et al. | Sept. 30, 1941 |
| 2,316,551 | Bonanno | Apr. 13, 1943 |
| 2,510,241 | Miller | June 6, 1950 |
| 2,674,328 | Searls | Apr. 6, 1954 |
| 2,683,956 | Conte | July 20, 1954 |
| 2,698,180 | Hersh | Dec. 28, 1954 |
| 2,718,729 | Giardina | Sept. 27, 1955 |
| 2,723,492 | Muller | Nov. 15, 1955 |
| 2,749,660 | Zimentstark | June 12, 1956 |
| 2,784,527 | Sarff | Mar. 12, 1957 |
| 2,787,970 | Bennett | Apr. 9, 1957 |
| 2,821,938 | Muller | Feb. 4, 1958 |
| 2,903,977 | Ulinski | Sept. 15, 1959 |

FOREIGN PATENTS

| | | |
|---|---|---|
| 997,731 | France | Sept. 12, 1951 |